United States Patent
Rakshit et al.

(10) Patent No.: US 11,238,235 B2
(45) Date of Patent: Feb. 1, 2022

(54) AUTOMATED NOVEL CONCEPT EXTRACTION IN NATURAL LANGUAGE PROCESSING

(71) Applicant: International Business Machines Corporation, Armonk, NY (US)

(72) Inventors: Sarbajit K. Rakshit, Kolkata (IN); James E. Bostick, Cedar Park, TX (US); Craig M. Trim, Ventura, CA (US); John M. Ganci, Jr., Raleigh, NC (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 16/574,545

(22) Filed: Sep. 18, 2019

(65) Prior Publication Data

US 2021/0081499 A1 Mar. 18, 2021

(51) Int. Cl.
*G06F 40/247* (2020.01)
*G06F 40/279* (2020.01)
(Continued)

(52) U.S. Cl.
CPC ............ *G06F 40/30* (2020.01); *G06F 16/243* (2019.01); *G06F 40/247* (2020.01); *G06F 40/279* (2020.01)

(58) Field of Classification Search
CPC .... G06F 16/30; G06F 16/332; G06F 16/3325; G06F 16/3329; G06F 16/3344;
(Continued)

(56) References Cited

U.S. PATENT DOCUMENTS 7,636,714 B1 * 12/2009 Lamping ............. G06F 16/3338
7,788,276 B2 * 8/2010 Peng ................... G06F 16/3338
707/765

(Continued)

OTHER PUBLICATIONS

Anonymous, Method and System for Automatically Refining a Set of Search Results using Natural Language Processing, IP.com Disclosure No. IPCOM00023, Nov. 13, 2014, IP.com, (4 Pages).

(Continued)

*Primary Examiner* — Martin Lerner
(74) *Attorney, Agent, or Firm* — Garg Law Firm, PLLC; Rakesh Garg; Christopher Pignato (57) ABSTRACT

From a natural language document using a natural language concept analyzer, a set of natural language input concepts is extracted. Using a query generation model, a query corresponding to the set of natural language input concepts is generated. From a set of natural language results using the natural language concept analyzer, a set of natural language output concepts is extracted, a result in the set of natural language results comprising a portion of narrative text within a natural language corpus, the result identified by searching the natural language corpus using the query. Using the set of natural language input concepts and the set of natural language output concepts, a novelty concept is scored, the scored novelty concept comprising a degree to which a natural language input concept in the set of natural language input concepts is external to a boundary defined by the set of natural language output concepts.

15 Claims, 7 Drawing Sheets

(51) Int. Cl.
*G06F 40/30* (2020.01)
*G06F 16/242* (2019.01)

(58) Field of Classification Search
CPC ...... G06F 40/20; G06F 40/247; G06F 40/279; G06F 40/284; G06F 40/30
USPC .......................... 704/1, 9, 10; 707/759, 765
See application file for complete search history.

(56) References Cited

U.S. PATENT DOCUMENTS

| | | | | |
|---|---|---|---|---|
| 8,819,000 | B1* | 8/2014 | Acharya | G06F 16/951 |
| | | | | 707/723 |
| 9,239,823 | B1* | 1/2016 | Upstill | G06F 40/247 |
| 11,003,638 | B2* | 5/2021 | Liu | G06F 16/213 |
| 2003/0217047 | A1* | 11/2003 | Marchisio | G06F 40/268 |
| 2004/0158559 | A1* | 8/2004 | Poltorak | G06F 40/289 |
| 2006/0173920 | A1* | 8/2006 | Adler | G06F 16/332 |
| 2007/0011154 | A1* | 1/2007 | Musgrove | G06F 40/247 |
| 2007/0073653 | A1 | 3/2007 | Raab | |
| 2008/0033741 | A1 | 2/2008 | Van Luchene et al. | |
| 2011/0320187 | A1* | 12/2011 | Motik | G06F 40/295 |
| | | | | 704/9 |
| 2012/0102427 | A1 | 4/2012 | Fenster et al. | |
| 2012/0109978 | A1* | 5/2012 | Datta | G06F 40/247 |
| | | | | 707/750 |
| 2013/0198195 | A1* | 8/2013 | Kumar | G06F 40/279 |
| | | | | 707/740 |
| 2014/0324808 | A1* | 10/2014 | Sandhu | G06F 40/30 |
| | | | | 707/706 |
| 2015/0178272 | A1 | 6/2015 | Geigel | |
| 2016/0162545 | A1* | 6/2016 | Bolivar | G06F 40/284 |
| | | | | 707/765 |
| 2016/0203187 | A1* | 7/2016 | Alonso | G06F 16/345 |
| | | | | 707/692 |
| 2017/0046398 | A1 | 2/2017 | Beretich, Jr. et al. | |
| 2017/0228434 | A1* | 8/2017 | Beller | G06F 40/279 |
| 2017/0270159 | A1* | 9/2017 | Wang | G06F 16/2425 |
| 2017/0322939 | A1* | 11/2017 | Byron | G06F 16/3329 |
| 2017/0351682 | A1 | 12/2017 | Lundberg | |
| 2017/0372204 | A1* | 12/2017 | Sweeney | G06F 40/30 |
| 2018/0060339 | A1* | 3/2018 | Chen | G06F 16/24556 |
| 2018/0189909 | A1 | 7/2018 | Zellner et al. | |
| 2018/0197001 | A1 | 7/2018 | Bender et al. | |
| 2018/0225291 | A1* | 8/2018 | Balinsky | G06F 40/284 |
| 2018/0225363 | A1 | 8/2018 | Keyngnaert et al. | |
| 2019/0318009 | A1* | 10/2019 | Miller | G06F 16/3322 |
| 2019/0361979 | A1* | 11/2019 | Lachmi | G06F 40/247 |
| 2020/0066277 | A1* | 2/2020 | Cronin | G06F 40/30 |

OTHER PUBLICATIONS

Xplatlabs, Novelty Checker & Ideation Tool, https://en.xlpat.com/novelty-checker/, 2019, (4 Pages).

* cited by examiner

FIGURE 7 form. Within the corpus, a document can express one or
AUTOMATED NOVEL CONCEPT EXTRACTION IN NATURAL LANGUAGE PROCESSING

TECHNICAL FIELD

The present invention relates generally to a method, system, and computer program product for document corpus analysis. More particularly, the present invention relates to a method, system, and computer program product for automated novel concept extraction in natural language processing.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content. Another branch of NLP pertains to cognitive analytics, the process of analyzing available information or knowledge to create, infer, deduce, or derive new information.

A corpus is a collection of documents in natural language more concepts, where a concept is an idea that is conveyed in a text portion or text phrases in the document. For example, a document including descriptions of various features of a hammer, screwdriver, pliers, and a wire cutter, and how and in which applications one might use each, can be said to express a concept of tool usage.

SUMMARY

The illustrative embodiments provide a method, system, and computer program product. An embodiment includes a method that extracts, from a natural language document using a natural language concept analyzer, a set of natural language input concepts, an input concept in the set of natural language input concepts comprising a natural language idea conveyed in text of the natural language document. An embodiment generates, using a query generation model, a query corresponding to the set of natural language input concepts, the query comprising a regular expression representative of text to be searched for within a natural language corpus. An embodiment extracts, from a set of natural language results using the natural language concept analyzer, a set of natural language output concepts, a result in the set of natural language results comprising a portion of narrative text within the natural language corpus, the result identified by searching the natural language corpus using the query. An embodiment scores, using the set of natural language input concepts and the set of natural language output concepts, a novelty concept, the scored novelty concept comprising a degree to which a natural language input concept in the set of natural language input concepts is external to a boundary defined by the set of natural language output concepts.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that it is difficult to determine whether, and to what degree, information regarding a concept is absent from a corpus. Although presently-available methods can search for a specific text string, absence of that specific text string from the corpus does not necessarily mean that a concept relating to the text string is also absent from the corpus. Instead, the concept might actually be described in the corpus, but using a synonym or an alternate spelling of a word in the text string. Additionally, text in the text string might have included a typographical error preventing the concept from being found in the corpus.

The illustrative embodiments also recognize that a concept may be described in natural language terms in a document. However, particular aspects, features, or limitations of the concept may not already be in a form suitable for use in a text string for searching. For example, a concept may be described in terms of an example or a use case, or descriptions of particular features of the concept may be vague, described in relative terms (e.g., "faster than what we have now", "small enough to be hand-held"), or scattered throughout the document. Thus, for an effective search, search terms must be extracted from the document and synonyms for search terms, if appropriate, systematically generated.

The illustrative embodiments also recognize that results of a search must be evaluated to determine a degree to which information regarding a concept is present in a corpus. A search might return some results that describe only a particular concept, in detail, while also returning other results that describer a broader or narrower version of the concept. For example, consider a search for a concept of non-powered hand tools having a specified set of features. A search for one or more text strings expressing this concept might result in documents describing conventional hammers, screwdrivers, and the like, but also documents describing powered tools, tools too large or too small to be considered hand tools, and tools that include only some of the specified features.

One particular use case involves a prior art search, to determine an extent to which a particular invention may be patentable. One general patentability requirement is that the invention be novel—in other words, not previously described in a printed publication. Thus, determining an extent to which a particular invention may be patentable requires determining that a corpus, such as a collection of previously-published patent applications and granted patents, does not describe a set of concepts that are features of the invention.

Consequently, the illustrative embodiments recognize that there is an unmet need to, from a natural language document description, extract a set of concepts, systematically generate a set of text strings describing the set of concepts, search a corpus using the generated set of text strings, evaluate the search results and refine the search if appropriate, and determine an extent to which the corpus does not encompass the description.

The illustrative embodiments recognize that the presently available tools or solutions do not address these needs or provide adequate solutions for these needs. The illustrative embodiments used to describe the invention generally address and solve the above-described problems and other problems related to automated novel concept extraction in natural language processing.

An embodiment can be implemented as a software application. The application implementing an embodiment can be configured as a modification of an existing natural language processing system, as a separate application that operates in conjunction with an existing natural language processing system, a standalone application, or some combination thereof.

Particularly, some illustrative embodiments provide a method by which a set of natural language input concepts can be extracted from a document, used to generate a search query for a corpus, and search results analyzed to determine a degree to which one of the input concepts is outside a boundary of concepts described in the corpus.

An embodiment uses a natural language concept analyzer to extract a set of input concepts, in natural language form, from an input document. The input document includes, in natural language form, a description. The embodiment's goal is to determine an extent to which a corpus does not already include information regarding the description in the input document. In the patent prior art use case, an embodiment's goal is to determine an extent to which a corpus does not already include a set of concepts that are features of an invention described in an input document.

To extract a set of input concepts, in natural language form, from an input document, an embodiment uses a natural language concept analyzer. In an embodiment, a natural language concept analyzer uses a set of rules to extract a set of input concepts. In one embodiment, the set of rules includes a name of a document section from which to identify concepts (for example, "Abstract", "Key Concepts", "Summary", and the like) and an instruction to convert every sentence or bullet point found in such a section into a separate natural language concept. In a further embodiment, the name of the document section is user-configurable.

In another embodiment, a natural language concept analyzer uses a set of NLP classifiers to classify sections of the document and words and sentences within the sections to identify concepts. Techniques for using NLP classifiers to identify concepts are presently available. One technique recognizes keywords within a document. For example, in a document describing ideas for an improved screwdriver, extracted keywords might include "screwdriver" and "improvement". Another technique involves contextual analysis, which uses an understanding of the subject matter of a document to generate additional keywords or additional limitations on keywords. For example, if the document describing ideas for an improved screwdriver includes a description of a biker keeping the screwdriver in a bicycle seat bag and using the screwdriver to adjust seat post height when biking over rocky terrain, a contextual analysis module uses this description as well as optional additional contextual information, either within the document or from another source, to generate a concept such as "small enough to store in a bicycle seat bag".

As a further example, the contextual analysis module uses additional contextual information, either within the document or from another source, to determine how small an item should be to be storable in a typical bicycle seat bag and replace the concept with a corresponding measurement (e.g., having a volume less than 25 cubic centimeters, with each dimension being less than 6 cm long). Another embodiment uses, as additional contextual information, results of an image analysis of one or more images included in an input document. For example, if the document describing ideas for an improved screwdriver includes an image of a biker storing a screwdriver in a bicycle seat bag and using the screwdriver to adjust seat post height near rocky terrain, an analysis of this image could assist a contextual analysis module in generating a concept such as "small enough to store in a bicycle seat bag". Another embodiment uses a combination of rules, NLP classifiers, and image analysis to extract a set of concepts from an input document. Another embodiment uses another presently-available technique for performing concept analysis and extraction.

An embodiment generates one or more queries from the set of input concepts. A generated query is text to be searched for within a natural language corpus, or a regular expression representative of text to be searched for within a natural language corpus. A regular expression is a sequence of characters that define a search pattern. To generate a query, an embodiment assembles one or more input concepts into a text string, then uses a synonym database to modify the original query or generate additional queries by substituting one or more synonyms for words within the set of input concepts. For example, if an input concept was "screwdriver with interchangeable heads", a set of corresponding search queries might be "screwdriver with interchangeable heads" (the original input concept), "screwdriver with transposable heads", and "screwdriver with exchangeable heads". Modifying the original query, when a word or phrase within the original query is known to produce poor search results, results in an improved search result set. Generating additional queries by substituting synonyms, in a systematic manner, results in a more thorough search result set than would be obtainable without such additional queries.

Once the query has been generated, an embodiment uses the query to search a natural language corpus, using any suitable search technique. The search produces one or more results. One result can be information that the corpus does not include any information responsive to the query. An embodiment also allows search parameters to be configured, either by a user or administrator, and an optional default configuration to be set. Search parameters can include a particular corpus or particular type of corpus to be searched. For example, when used in a prior art search to evaluate patentability, one particular corpus to be searched might be the United States Patent and Trademark Office's (USPTO) database of published patent applications, and one particular type of corpus to be searched might be granted patents and published patent applications. Search parameters can include particular terms that are added to a query under certain circumstances. For example, a user searching for information on competing products might configure a set of search queries to always include one or more competitors' names. Search parameters can include additional configuration settings. By including the ability to standardize search parameters, an embodiment enforces a set of best practices, maximizing search effectiveness and minimizing inadvertent omission of search results.

An embodiment extracts a set of natural language output concepts from the set of search results. To extract the set of output concepts, an embodiment uses a natural language concept analyzer in a manner described herein.

One embodiment produces one or more output concepts describing the entirety of the search results. Another embodiment produces one or more output concepts describing each of the search results individually.

An embodiment uses Uniform Resource Locators (URLs) of each search result, or another reference to each search result, to deduplicate search results. In particular, if two or more search results have the same URL or other reference, both search results actually reference the same document and are thus duplicates. Only one of the duplicate search results needs to be maintained.

An embodiment uses entity names found within search results, output concepts determined for search results, and other results of analyzing search results to further deduplicate search results. In particular, if two or more search results both include sets of entity names that are above a threshold similarity to each other, as determined using any suitable similarity score, an embodiment can assume that both search results actually reference the same information and are thus near-duplicates. Similarly, if two or more search results are both described by the same set of output concepts, or sets of output concepts that are above a threshold similarity to each other, as determined using any suitable similarity score, an embodiment can assume that both search results actually reference the same information and are thus near-duplicates as well. An embodiment can be configured to remove all but one of a set of duplicate or near-duplicate results from a set of results. An embodiment can also be configured to use a particular threshold for identifying and removing near-duplicate results from a set of results.

An embodiment uses the set of input concepts and the set of output concepts to determine and score a novelty concept.

In particular, a novelty concept is an input concept that is at least partially outside a boundary defined by the set of output concepts, and the score reflects a degree to which the novelty concept is external to the boundary. A high score, for example 0.9 using a 0-1 scale, reflects a novelty concept that is almost completely different from the input concept set. A low score, for example 0.2 using a 0-1 scale, reflects a novelty concept that is almost completely similar to the input concept set. For example, a novelty concept that includes all the concepts in the input concept set but done a different way, such as with greater efficiency, might score a 0.2.

An embodiment is configurable to present any of the extracted input concepts, the generated search query, the raw or abstracted search results or a subset of the raw or abstracted search results, the output concepts, and one or more scored novelty concepts, and other data, to a user to allow for adjustment and re-performance of the search. Allowing a user to adjust the set of extracted input concepts enables a user to add a concept the concept analyzer might have omitted, remove a concept that the user does not consider necessary to the search, or adjust a concept to generate an adjusted search query. Allowing a user to manually adjust the generated search query enables a user to add, remove, or adjust a query in response to previous search results—for example, to attempt to produce more general or more specific results, or results covering a concept or synonym that was not searched for in a previous search.

An embodiment presents one or more scored novelty concepts to a user. Presenting scored novelty concepts to a user allows the user to adjust the input document used to generate the set of input concepts, or allows the user to adjust one or more input concepts directly. Adjusting the document or input concepts in this manner allows a user to capture particular points of novelty, for example to use in generating potential patent claim language corresponding to an invention.

An embodiment generates natural language text for a scored novelty concept. One embodiment generates natural language text only for each scored novelty concept having a score above a threshold score. Another embodiment generates natural language text for the top n novelty concepts, ranked by the concepts' scores, where n is an integer greater than zero. Another embodiment generates natural language text for the top n novelty concepts, ranked by the concepts' scores, as long as each score is also above a threshold score. The generated natural language text can be in the form of one or more narrative text sentences, narrative text bullet points, patent claim language, or any other form of natural language text.

An embodiment is configurable to learn from search results, user adjustments, or both, to improve input concept extraction and search query generation. Learning may be specific to a particular use case or subject area. For example, if an embodiment is used to conduct prior art searches for a patentability analysis, and a user removes mention of a particular color from a set of input concepts or generated search query, an embodiment can conclude that specification of a particular color is not important in prior art searches, and learn to not specify a particular color in future concepts or queries. Learning may also be general, not specific to a particular use case or subject area. For example, an embodiment's database of synonyms, for use in generating one or more search queries from a set of concepts, may include some synonyms with meanings that are too broad, or with multiple meanings. If, over time, a user refines a query to remove certain synonyms, an embodiment can learn that these synonyms are not helpful in a search query, perhaps because they have too broad a meaning, and cease using these synonyms. Similarly, if an embodiment observes that a result set includes multiple sets of concepts that are very different from each other, an embodiment can learn that a word in the search query has multiple meanings, and should be used with sufficient additional modifiers or replaced with a synonym in order to restrict the query to only one meaning. Similarly, if an embodiment observes that one result set, obtained using a particular search word, is consistently larger or includes consistently fewer irrelevant results than another result set obtained using a synonym for the search word, an embodiment can learn that the search word is preferred over its synonym, and use the search word over its synonym in future queries. Similarly, if an embodiment observes that one result set, obtained using a particular corpus or set of corpuses, is consistently larger or includes consistently fewer irrelevant results than another result set obtained using a different corpus, an embodiment can learn that the first corpus or set of corpuses is preferred over the second for a particular type of search, and use the first corpus for that type of search in future queries.

The manner of automated novel concept extraction in natural language processing described herein is unavailable in the presently available methods in the technological field of endeavor pertaining to NLP. A method of an embodiment described herein, when implemented to execute on a device or data processing system, comprises substantial advancement of the functionality of that device or data processing system in extracting a set of natural language input concepts from a document, using the set of input concepts to generate a search query for a corpus, and analyzing search results to determine a degree to which one of the input concepts is outside a boundary of concepts described in the corpus.

The illustrative embodiments are described with respect to certain types of analyses, concepts, contexts, searches, queries, search results, deduplications, contents, thresholds, scores, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
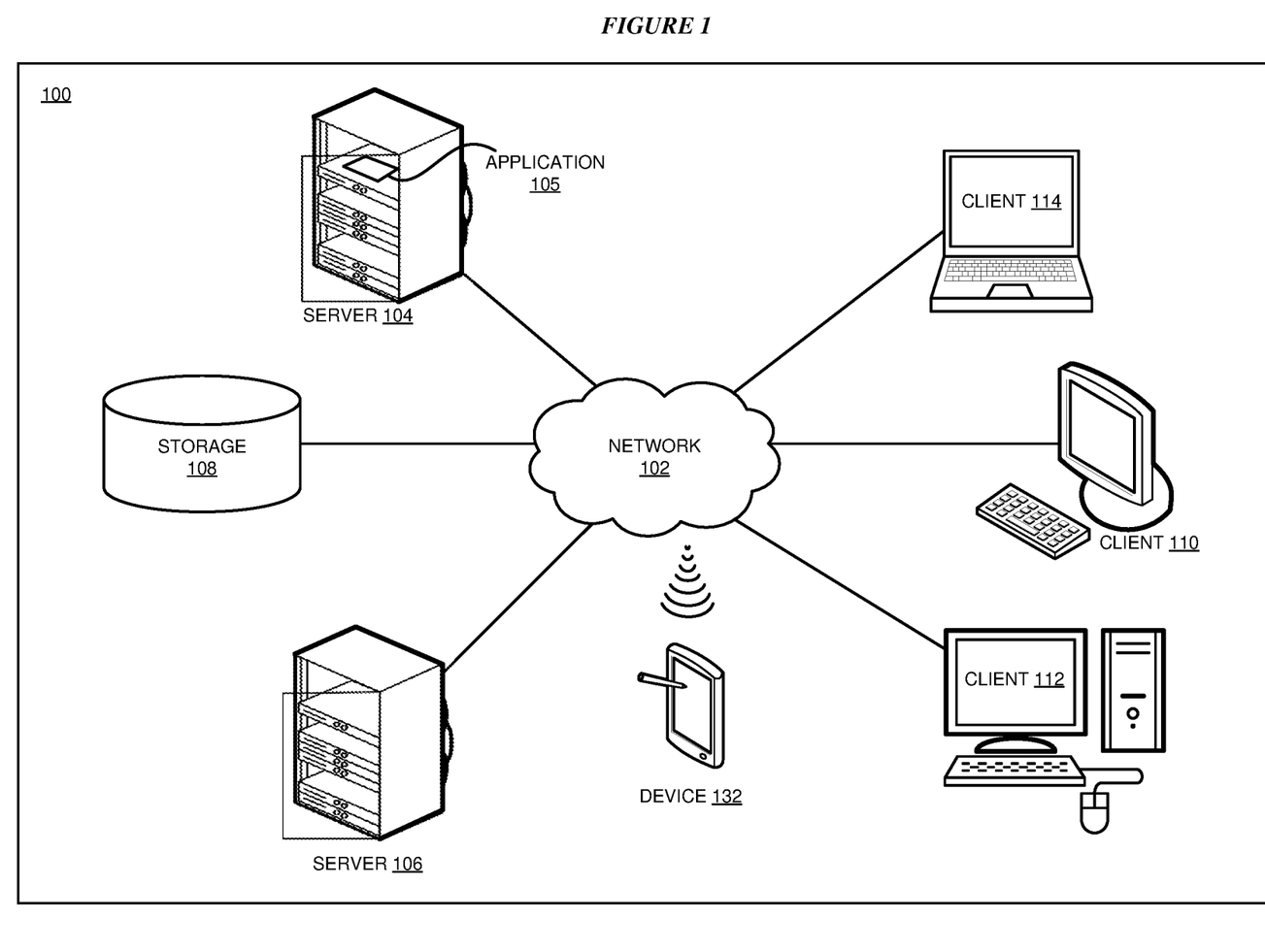
FIG. 1 depicts a block diagram of a network of data processing systems in which illustrative embodiments may be implemented.
Figure 2:
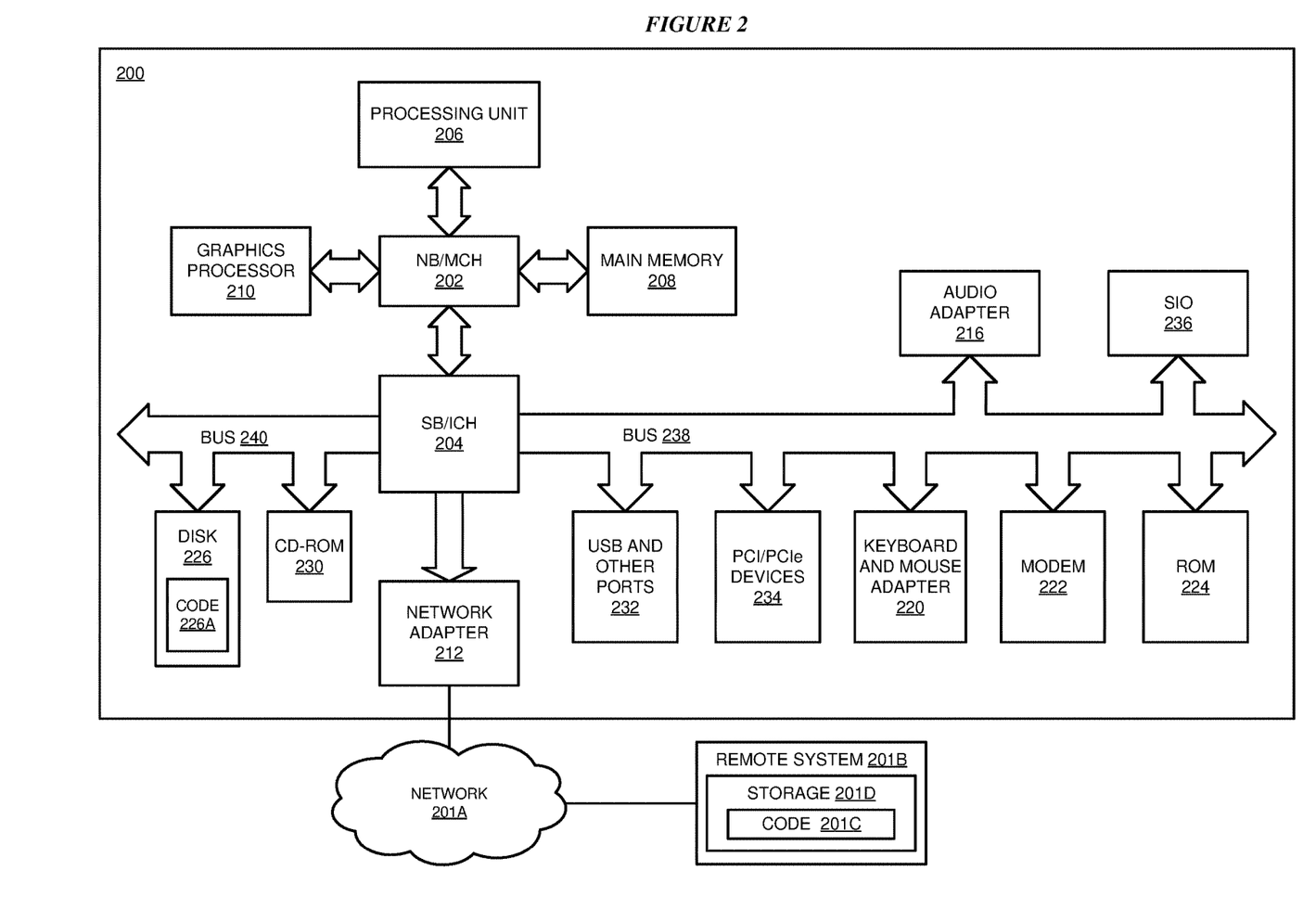
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
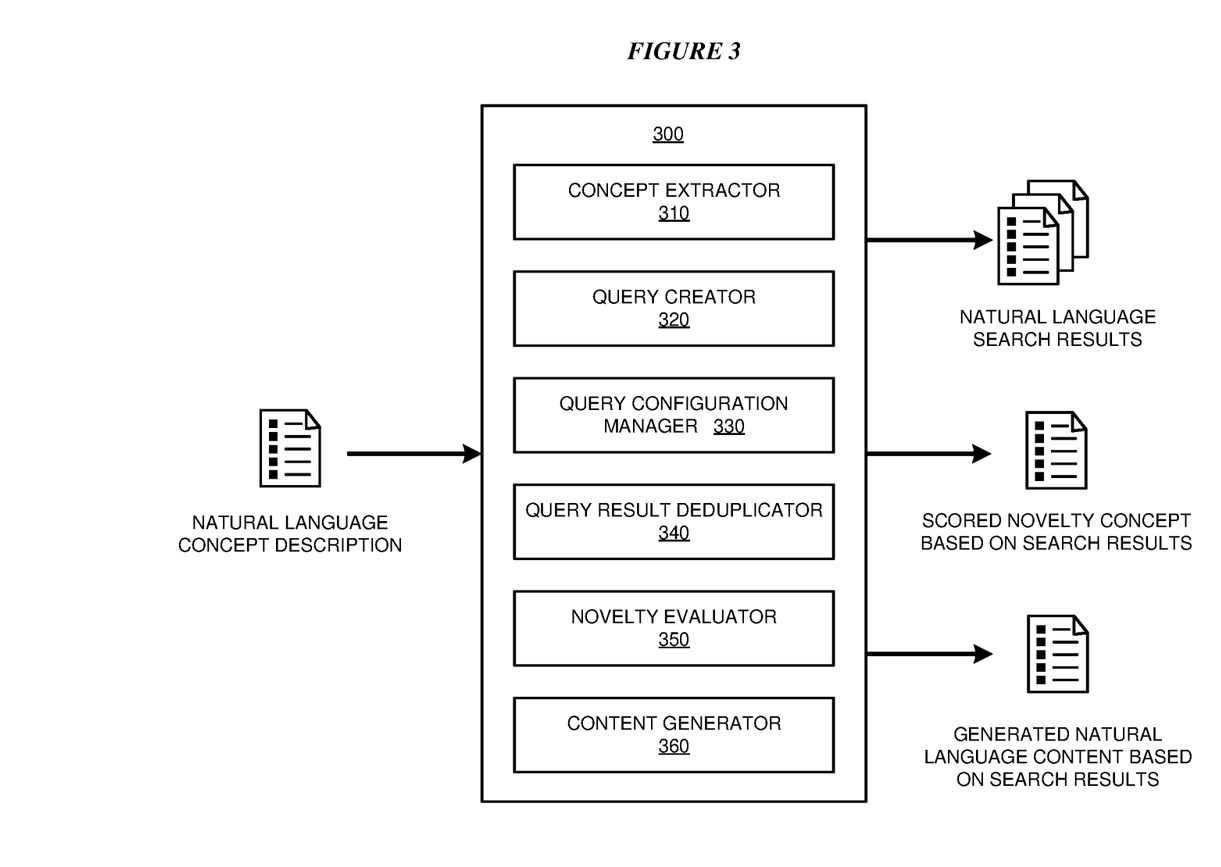
FIG. 3 depicts a block diagram of an example configuration for automated novel concept extraction in natural language processing in accordance with an illustrative embodiment.

With reference to FIG. 3, this figure depicts a block diagram of an example configuration for automated novel concept extraction in natural language processing in accordance with an illustrative embodiment. Application 300 is an example of application 105 in FIG. 1 and executes in any of servers 104 and 106, clients 110, 112, and 114, and device 132 in FIG. 1.

Application 300 takes, as input, a natural language document describing a concept. Application 300 produces, as output, one or more natural language search results, a scored novelty concept based on the search results, and generated natural language content based on a scored novelty concept.

Concept extractor 310 uses a natural language concept analyzer to extract a set of input concepts, in natural language form, from an input document. To extract a set of input concepts, in natural language form, from an input document, concept extractor 310 uses a natural language concept analyzer. In one implementation of concept extractor 310, a natural language concept analyzer uses a set of rules to extract a set of input concepts. In one implementation, the set of rules includes a name of a document section from which to identify concepts (for example, "Abstract", "Key Concepts", "Summary", and the like) and an instruction to convert every sentence or bullet point found in such a section into a separate natural language concept. The name of the document section can be implemented in a user-configurable manner.

In another implementation of concept extractor 310, a natural language concept analyzer uses a set of NLP classifiers to classify sections of the document and words and sentences within the sections to identify concepts. One technique recognizes keywords within a document. Another technique involves contextual analysis, which uses an understanding of the subject matter of a document to generate additional keywords or additional limitations on keywords. Another implementation uses, as additional contextual information, results of an image analysis of one or more images included in an input document. Another implementation uses a combination of rules, NLP classifiers, image analysis, and another presently-available technique for performing concept analysis and extraction.

Query creator 320 generates one or more queries from the set of input concepts. A generated query is text to be searched for within a natural language corpus. To generate a query, query creator 320 assembles one or more of the input concepts into a text string, then uses a synonym database to generate additional queries by substituting one or more synonyms for words within the set of input concepts.

Once the query has been generated, application 300 uses the query to search a natural language corpus, using any suitable search technique to produce one or more results. Query configuration manager 330 allows search parameters to be configured, either by a user or administrator, and an optional default configuration to be set. Search parameters can include a particular corpus or particular type of corpus to be searched, particular terms that are added to a query under certain circumstances, and additional configuration settings.

Concept extractor 310 extracts a set of natural language output concepts from the set of search results, using a natural language concept analyzer in a manner described herein. Module 310 can be configured to produce one or more output concepts describing the entirety of the search results, or one or more output concepts describing each of the search results individually.

Query result deduplicator 340 uses Uniform Resource Locators (URLs) of each search result, or another reference to each search result, to deduplicate search results. In particular, if two or more search results have the same URL or other reference, both search results actually reference the same document and are thus duplicates. Only one of the duplicate search results needs to be maintained.

Query result deduplicator 340 uses entity names found within search results, output concepts determined for search results, and other results of analyzing search results to further deduplicate search results. In particular, if two or more search results both include sets of entity names that are above a threshold similarity to each other, as determined using any suitable similarity score, module 340 can assume that both search results actually reference the same information and are thus near-duplicates. Similarly, if two or more search results are both described by the same set of output concepts, or sets of output concepts that are above a threshold similarity to each other, as determined using any suitable similarity score, module 340 can assume that both search results actually reference the same information and are thus near-duplicates as well. Module 340 can be configured to remove all but one of a set of duplicate or near-duplicate results from a set of results. Module 340 can also be configured to use a particular threshold for identifying and removing near-duplicate results from a set of results.

Novelty evaluator 350 uses the set of input concepts and the set of output concepts to determine and score a novelty concept. Content generator 360 generates natural language text for a scored novelty concept. Module 360 is configurable to generate natural language text only for each scored novelty concept having a score above a threshold score. Module 360 is also configurable to generate natural language text for the top n novelty concepts, ranked by the concepts' scores, where n is an integer greater than zero. Module 360 is also configurable to generate natural language text for the top n novelty concepts, ranked by the concepts' scores, as long as each score is also above a threshold score. The generated natural language text can be in the form of one or more narrative text sentences, narrative text bullet points, patent claim language, or any other form of natural language text.

Application 300 is configurable to present any of the extracted input concepts, the generated search query, the raw or abstracted search results or a subset of the raw or abstracted search results, the output concepts, and one or more scored novelty concepts, and other data, to a user to allow for adjustment and re-performance of the search, as well as to adjust the input document used to generate the set of input concepts and to adjust one or more of the set of input concepts directly. Application 300 is also configurable to learn from search results, user adjustments, or both, to improve input concept extraction and search query generation.

Figure 4:
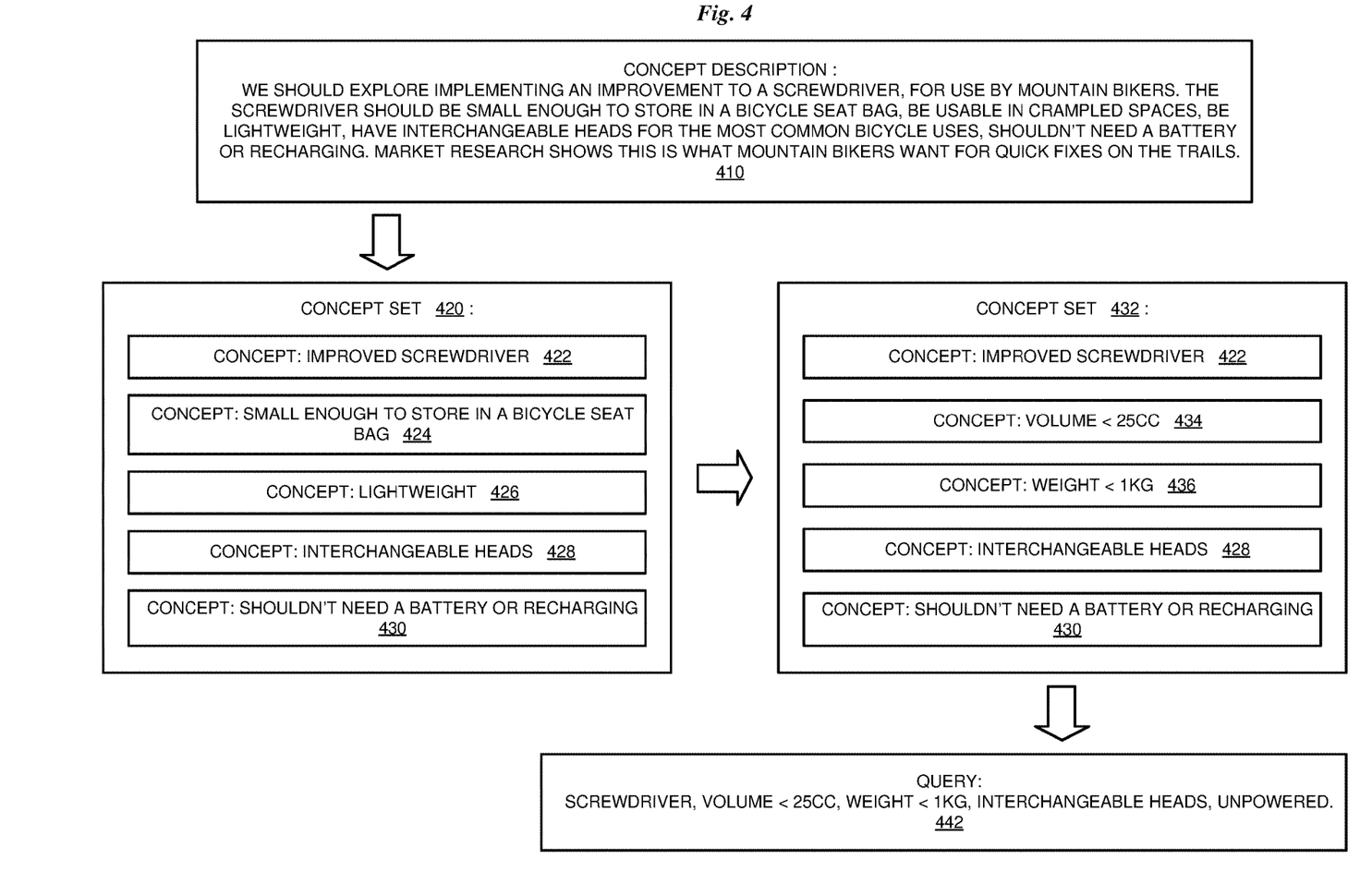
FIG. 4 depicts an example of automated novel concept extraction in natural language processing in accordance with an illustrative embodiment.

With reference to FIG. 4, this figure depicts an example of automated novel concept extraction in natural language processing in accordance with an illustrative embodiment. The example can be executed using application 300 in FIG. 3.

As depicted, concept description 410 is a natural language document describing possible improvements to a screwdriver. Application 300's goal is to determine an extent to which a corpus does not already include information regarding the description in concept description 410.

Application 300 uses a natural language concept analyzer to extract concept set 420, in natural language form, from concept description 410. Concept set 420 includes concepts 422, 424, 426, 428, and 430. Using additional contextual information, application 300 has converted concept 424 into concept 434, and has converted concept 426 into concept 436, forming concept set 432. Query 442 is an example of one or more queries application 300 generates from concept set 432.

Figure 5:
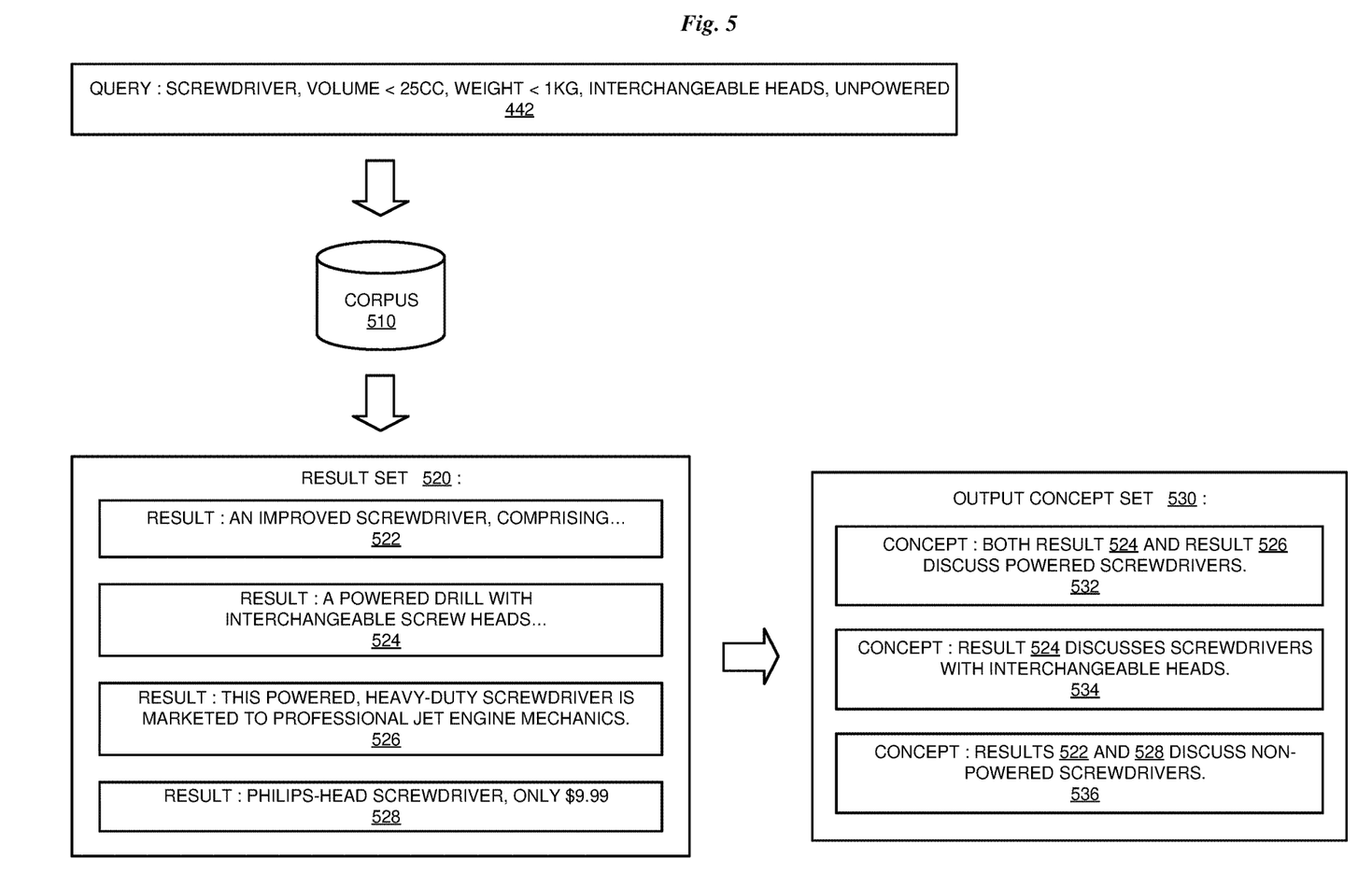
FIG. 5 depicts a continued example of automated novel concept extraction in natural language processing in accordance with an illustrative embodiment.

With reference to FIG. 5, this figure depicts a continued example of automated novel concept extraction in natural language processing in accordance with an illustrative embodiment. Query 442 is the same as query 442 in FIG. 4. The example can be executed using application 300 in FIG. 3.

Application 300 uses query 442 to search natural language corpus 510 using any suitable search technique. The search produces result set 520, which includes results 522, 524, 526, and 528. Application 300 extracts output concept set 530, using a natural language concept analyzer in a manner described herein. Output concept set 530 includes concepts 532, 534, and 536, each describing one or more of results 522, 524, 526, and 528.

Figure 6:
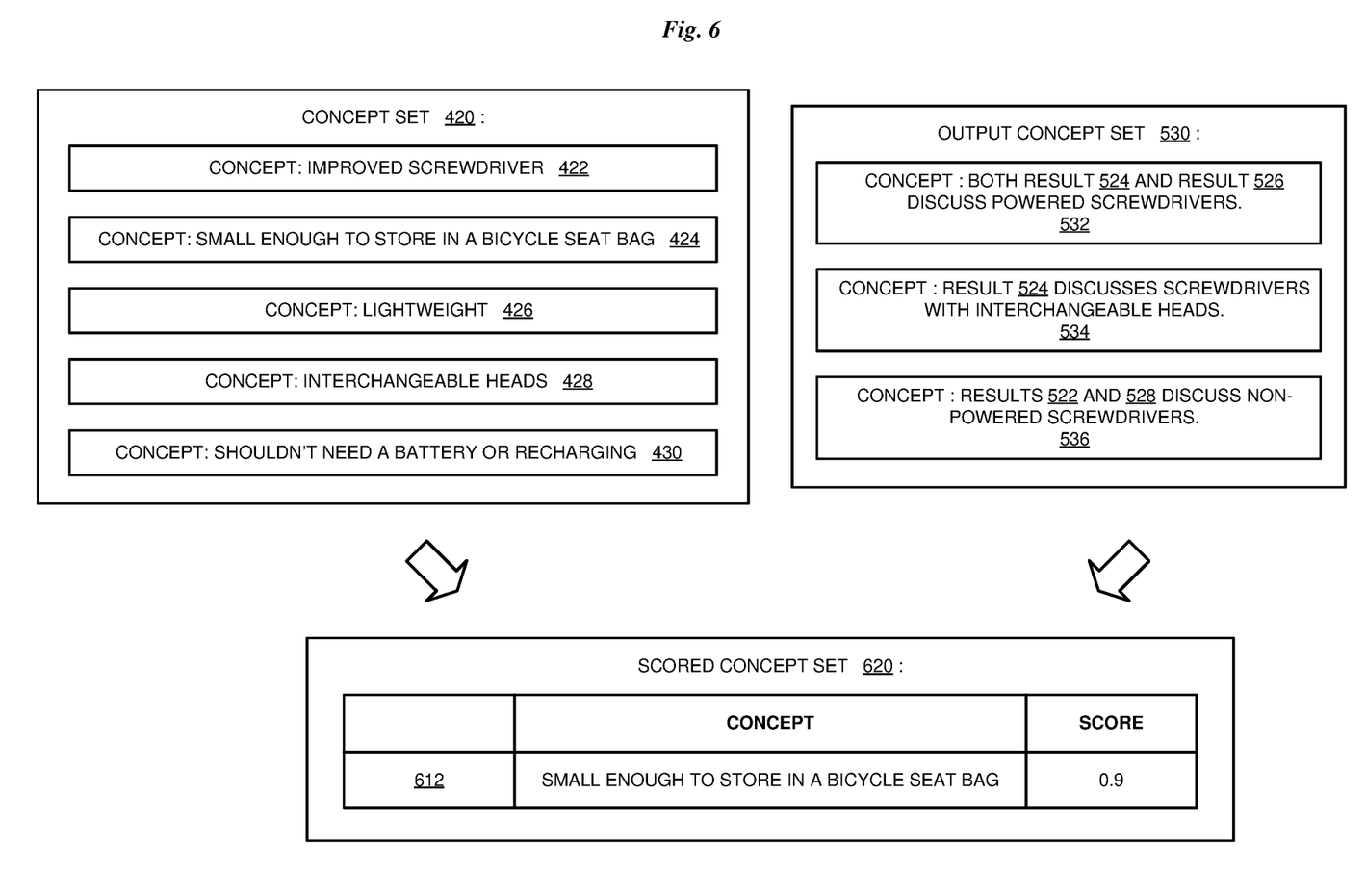
FIG. 6 depicts a continued example of automated novel concept extraction in natural language processing in accordance with an illustrative embodiment.

With reference to FIG. 6, this figure depicts a continued example of automated novel concept extraction in natural language processing in accordance with an illustrative embodiment. Concept set 420 and concepts 422, 424, 426, 428, and 430 are the same as concept set 420 and concepts 422, 424, 426, 428, and 430 in FIG. 4. Output concept set 530 and concepts 532, 534, and 536 are the same as output concept set 530 and concepts 532, 534, and 536 in FIG. 5. The example can be executed using application 300 in FIG. 3.

As depicted, application 300 has used concept set 420 and output concept set 530 to determine and score scored novelty concept set 620, including novelty concept 612. Novelty concept 612 has been scored as 0.9, on a 0-1 scale, reflecting a degree to which novelty concept 612 is outside a boundary defined by output concept set 530. Application 300 presents novelty concept set 620 to a user, and optionally generates corresponding natural language text (not shown).

Figure 7:
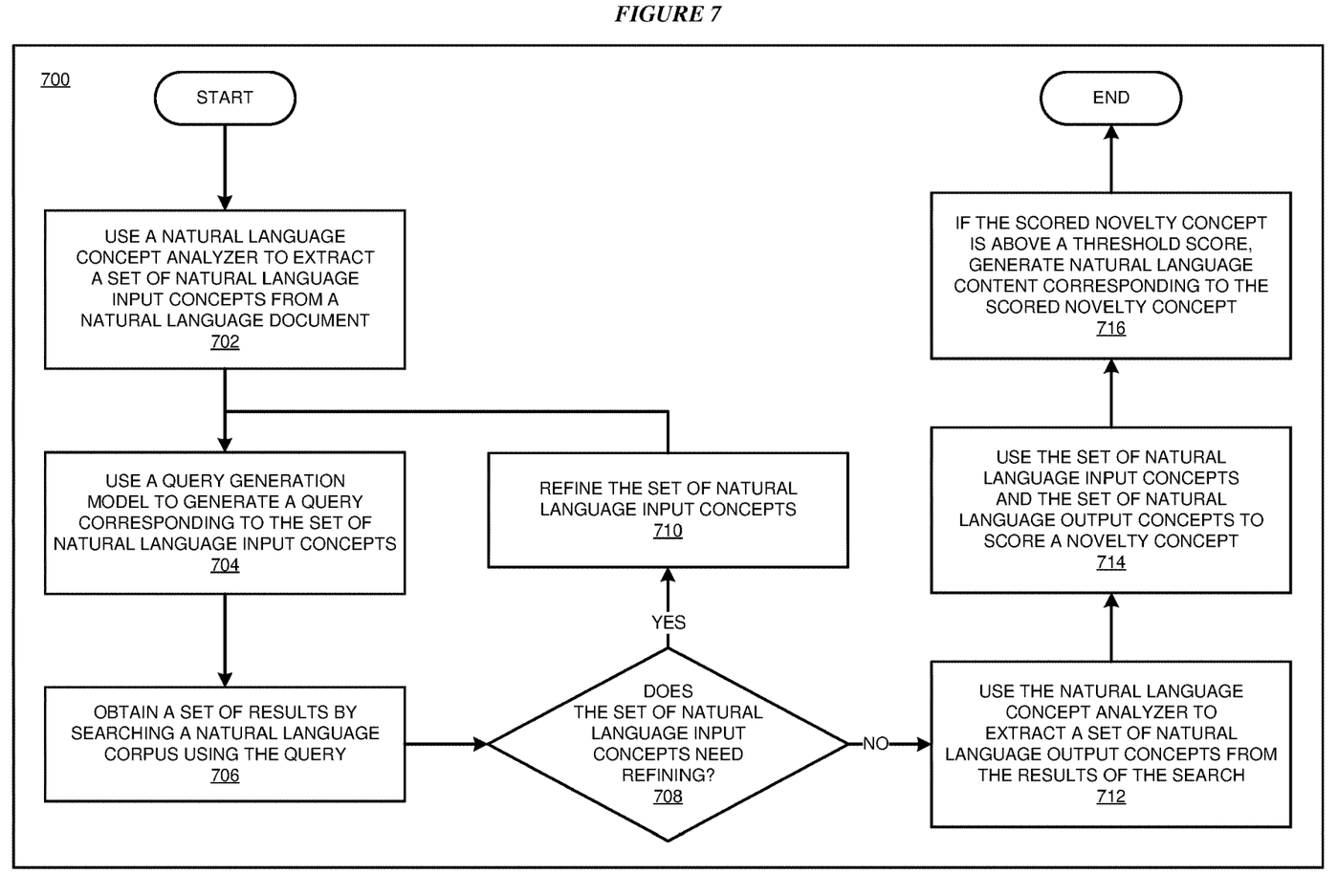
FIG. 7 depicts a flowchart of an example process for automated novel concept extraction in natural language processing in accordance with an illustrative embodiment.

With reference to FIG. 7, this figure depicts a flowchart of an example process for automated novel concept extraction in natural language processing in accordance with an illustrative embodiment. Process 700 can be implemented in application 300 in FIG. 3.

In block 702, the application uses a natural language concept analyzer to extract a set of natural language input concepts from a natural language document. In block 704, the application uses a query generation model to generate a query corresponding to the set of natural language input concepts. In block 706, the application obtains a set of results by searching a natural language corpus using the query. In block 708, the application determines whether the set of natural language input concepts needs refining. If yes ("YES" path of block 708), in block 710, the application refines the set of natural language input concepts, then returns to block 704. Otherwise ("NO" path of block 708), in block 712, the application uses the natural language concept analyzer to extract a set of natural language output concepts from the results of the search. In block 714, the application uses the set of natural language input concepts and the set of natural language output concepts to score a novelty concept. In block 716, the application, if the scored novelty concept is above a threshold score, generates natural language content corresponding to the scored novelty concept. Then the application ends.

Thus, a computer implemented method, system or apparatus, and computer program product are provided in the illustrative embodiments for automated novel concept extraction in natural language processing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:

extracting, from a natural language document using a natural language concept analyzer, a set of natural language input concepts, an input concept in the set of natural language input concepts comprising a natural language idea conveyed in text of the natural language document;

generating, using a query generation model, a query corresponding to the set of natural language input concepts, the query comprising a regular expression representative of text to be searched for within a natural language corpus;

generating, using the query generation model, a second query corresponding to the set of natural language input concepts, the second query including a synonym for a word within the query;

extracting, from a set of natural language results using the natural language concept analyzer, a set of natural language output concepts, a result in the set of natural language results comprising a portion of narrative text within the natural language corpus, the result identified by searching the natural language corpus using the query and the second query;

scoring, using the set of natural language input concepts and the set of natural language output concepts, the input concept as a novelty concept, the scoring resulting in a score, the score denoting a degree to which the input concept is external to a boundary defined by the set of natural language output concepts; and generating, responsive to the score being below a threshold score, a third query corresponding to a modified set of natural language input concepts, the modified set of natural language input concepts modified using the scored novelty concept.

2. The computer-implemented method of claim 1, wherein the input concept comprises a keyword recognized by the natural language concept analyzer, the keyword included in the natural language document.

3. The computer-implemented method of claim 1, wherein the input concept comprises contextual information relative to a keyword recognized by the natural language concept analyzer, the keyword included in the natural language document.

4. The computer-implemented method of claim 1, further comprising:

removing, from the set of natural language results, a first result in the set of natural language results having above a similarity score to a second result in the set of natural language results.

5. The computer-implemented method of claim 1, further comprising:

generating, responsive to the score of the scored novelty concept being equal to or above the threshold score, natural language text corresponding to the scored novelty concept.

6. A computer usable program product comprising one or more computer-readable storage devices, and program instructions stored on at least one of the one or more storage devices, the stored program instructions comprising:

program instructions to extract, from a natural language document using a natural language concept analyzer, a set of natural language input concepts, an input concept in the set of natural language input concepts comprising a natural language idea conveyed in text of the natural language document;

program instructions to generate, using a query generation model, a query corresponding to the set of natural language input concepts, the query comprising a regular expression representative of text to be searched for within a natural language corpus;

program instructions to generate, using the query generation model, a second query corresponding to the set of natural language input concepts, the second query including a synonym for a word within the query;

program instructions to extract, from a set of natural language results using the natural language concept analyzer, a set of natural language output concepts, a result in the set of natural language results comprising a portion of narrative text within the natural language corpus, the result identified by searching the natural language corpus using the query and the second query;

program instructions to score, using the set of natural language input concepts and the set of natural language output concepts, the input concept as a novelty concept, the scoring resulting in a score, the score denoting a degree to which the input concept is external to a boundary defined by the set of natural language output concepts; and program instructions to generate, responsive to the score being below a threshold score, a third query corresponding to a modified set of natural language input concepts, the modified set of natural language input concepts modified using the scored novelty concept.

7. The computer usable program product of claim 6, wherein the input concept comprises a keyword recognized by the natural language concept analyzer, the keyword included in the natural language document.

8. The computer usable program product of claim 6, wherein the input concept comprises contextual information relative to a keyword recognized by the natural language concept analyzer, the keyword included in the natural language document.

9. The computer usable program product of claim 6, further comprising:

program instructions to remove, from the set of natural language results, a first result in the set of natural language results having above a similarity score to a second result in the set of natural language results.

10. The computer usable program product of claim 6, further comprising:

program instructions to generate, responsive to the score of the scored novelty concept being equal to or above the threshold score, natural language text corresponding to the scored novelty concept.

11. The computer usable program product of claim 6, wherein the stored program instructions are stored in the at least one of the one or more storage devices of a local data processing system, and wherein the stored program instructions are transferred over a network from a remote data processing system.

12. The computer usable program product of claim 6, wherein the stored program instructions are stored in the at least one of the one or more storage devices of a server data processing system, and wherein the stored program instructions are downloaded over a network to a remote data processing system for use in a computer readable storage device associated with the remote data processing system.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to extract, from a natural language document using a natural language concept analyzer, a set of natural language input concepts, an input concept in the set of natural language input concepts comprising a natural language idea conveyed in text of the natural language document;

program instructions to generate, using a query generation model, a query corresponding to the set of natural language input concepts, the query comprising a regular expression representative of text to be searched for within a natural language corpus;

program instructions to generate, using the query generation model, a second query corresponding to the set of natural language input concepts, the second query including a synonym for a word within the query;

program instructions to extract, from a set of natural language results using the natural language concept analyzer, a set of natural language output concepts, a result in the set of natural language results comprising a portion of narrative text within the natural language corpus, the result identified by searching the natural language corpus using the query and the second query;

program instructions to score, using the set of natural language input concepts and the set of natural language output concepts, the input concept as a novelty concept, the scoring resulting in a score, the score denoting a degree to which the input concept is external to a boundary defined by the set of natural language output concepts; and     program instructions to generate, responsive to the score being below a threshold score, a third query corresponding to a modified set of natural language input concepts, the modified set of natural language input concepts modified using the scored novelty concept.

14. The computer system of claim 13, wherein the input concept comprises a keyword recognized by the natural language concept analyzer, the keyword included in the natural language document.

15. The computer system of claim 13, wherein the input concept comprises contextual information relative to a keyword recognized by the natural language concept analyzer, the keyword included in the natural language document.

\* \* \* \* \*